United States Patent

Takemura et al.

[11] Patent Number: 5,106,347
[45] Date of Patent: Apr. 21, 1992

[54] ROTATIONAL SPEED DIFFERENTIAL RESPONSIVE TYPE TORQUE TRANSMITTING ASSEMBLY WITH VARIABLE ORIFICE MEANS

[75] Inventors: Toji Takemura, Yokohama; Koichi Kitamura, Yamato, both of Japan

[73] Assignee: Nissan Motor Co., Ltd., Yokohama, Japan

[21] Appl. No.: 432,671

[22] Filed: Nov. 7, 1989

[30] Foreign Application Priority Data

Nov. 8, 1988 [JP] Japan .................................. 63-281811
Jan. 27, 1989 [JP] Japan .................................. 1-18353

[51] Int. Cl.⁵ .............................................. F16H 1/44
[52] U.S. Cl. ...................................... 475/90; 475/231; 192/60
[58] Field of Search .................. 475/84, 85, 87, 88, 475/89, 90, 93, 94; 192/60, 61; 60/485, 413; 91/484, 498

[56] References Cited

U.S. PATENT DOCUMENTS

| | | | |
|---|---|---|---|
| 2,511,518 | 6/1950 | Stephens | 192/60 |
| 2,595,479 | 5/1952 | Nelson | 192/60 |
| 3,663,125 | 5/1972 | Freeman | 91/498 X |
| 3,808,951 | 5/1974 | Martin | 91/498 X |
| 3,831,461 | 8/1974 | Mueller | 74/711 |
| 4,091,901 | 5/1978 | F'Geppert | 192/61 |
| 4,096,712 | 6/1978 | Webb | 64/26 |
| 4,296,849 | 10/1981 | Pellegrino | 192/61 |
| 4,518,069 | 5/1985 | Elias | 192/60 |
| 4,727,966 | 3/1988 | Hiramatsu et al. | 192/0.033 |
| 4,829,769 | 5/1989 | Hiramatsu | 192/60 X |
| 4,875,665 | 10/1989 | Kato et al. | 60/413 X |
| 4,921,085 | 5/1990 | Takemura et al. | 192/60 |
| 4,932,510 | 6/1990 | Takemura et al. | 192/60 |
| 4,957,473 | 9/1990 | Takemura et al. | 475/231 |
| 4,958,711 | 9/1990 | Okubo et al. | 192/60 |
| 5,024,309 | 6/1991 | Takemura et al. | 192/60 |

FOREIGN PATENT DOCUMENTS

2609135 7/1988 France .................................. 475/90
61-62642 3/1986 Japan .

*Primary Examiner*—Leslie A. Braun
*Assistant Examiner*—Khoi Q. Ta
*Attorney, Agent, or Firm*—Foley & Lardner

[57] ABSTRACT

A limited slip differential is disclosed which includes a first rotary element, a second rotary element, and a hydraulic unit including a plurality of reciprocal pistons in slidable engagement with an internal cam surface of the first rotary element. The hydraulic unit includes an accumulator and a fluid passage in fluid communication with the accumulator and each of pressure chambers defined by the pistons. A variable flow restrictor is provided between the accumulator and each of the pressure chambers to automatically regulate a differential slip limiting torque in response to variation of rotational speed differential between driving wheels.

13 Claims, 6 Drawing Sheets

ROTATIONAL SPEED DIFFERENTIAL RESPONSIVE TYPE TORQUE TRANSMITTING ASSEMBLY WITH VARIABLE ORIFICE MEANS

BACKGROUND OF THE INVENTION

1. Field of the Invention

The present invention relates to a rotational speed differential responsive type torque transmitting assembly, and also to a differential unit incorporating a rotational speed differential responsive type torque transmitting assembly.

2. Description of the Prior Art

A differential unit with a rotational speed differential responsive type torque transmitting assembly is known from Japanese Patent Provisional Publication No. 61-62642.

This differential unit comprises a rotary casing, and a pinion assembly rotatable with the casing. The pinion assembly includes a pinion carrier and pinions on the pinion carrier. A pair of side gears are in mesh with the pinions. Rotatable with these side gears are a pair of rotary cams, respectively. These rotary cams are arranged in a face-to-face spaced relationship, and have a sleeve disposed therebetween. A partition within the sleeve divides the interior thereof into first and second cylindrical chambers. The cylindrical chambers open toward the cam surfaces of the rotary cams, respectively. A body of silicon oil fills these chambers. A pair of plungers are received in the chambers and becomes slidably engaged with the cam surfaces of the rotary cams, respectively. The partition is formed with an orifice which allows a restricted fluid flow communication between the chambers.

This differential unit has numerous problems. When a rotational speed differential occurs between the pair of side gears, the plungers are caused to reciprocate therefore subjecting the oil within the sleeve to adiabatic compression. This adiabatic compression causes the oil temperature to increase in volume. In this instance, since the sleeve is arranged eccentric with the rotation of the rotary casing, the oil within the sleeve is subjected to a centrifugal force, resulting in a further increase in volume of oil. As a result, a substantially great internal force builds up, causing a deformation of oil rounded tops of the plungers and damage on the cam surfaces.

Such a great internal force will inevitably cause a breakage of the seal, and therefore a leakage of oil, which leads to a shortage of oil after a long use.

Upon an occurence of such a rotational speed differential, the plungers urge the casing and its cover apart from each other. Since the rotary casing is rotatably supported by side bearings, these bearings are subject to this stress from the casing. As a result, the side bearings become bulky and need increased installation space.

With a view to solving the above problems, a rotational speed differential responsive type torque transmitting assembly for a differential unit has been proposed as disclosed in U.S. patent application Ser. No. 07/267,602 filed on Nov. 7, 1988 and assigned to the same assignee of this application. In this torque transmitting assembly, orifices of a fixed or constant opening are employed for providing restricted fluid communication between associated pressure chambers and an accumulator chamber.

Figure 4:
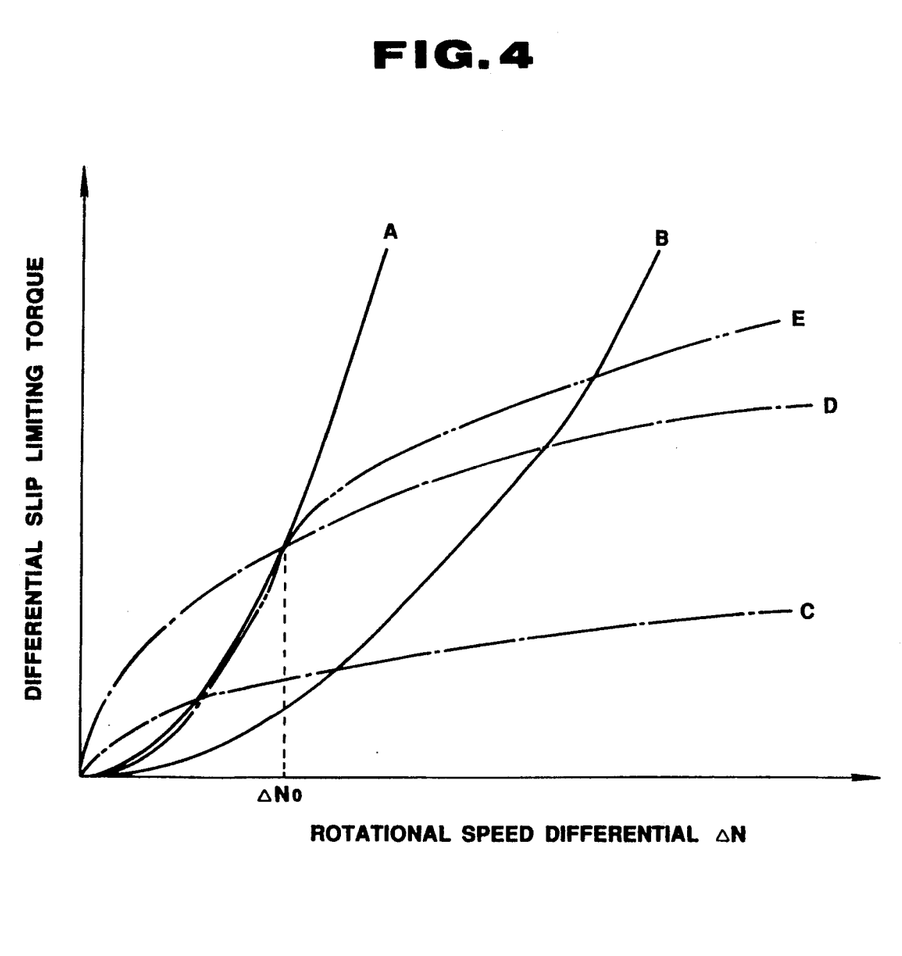
FIG. 4 is a graph depicting a torque transmitting characteristic of the torque transmitting assembly of FIG. 1.

This assembly provides a torque transmitting characteristic represented by, for example, a solid line curve "A" or "B" in the graph of FIG. 4, i.e., a curve of secondary order represented by $y = a x^2$ where "y" is a differential slip limiting torque, "x" is a rotational speed differential and "a" is a constant.

In the case where the assembly is designed to have the torque transmitting characteristic "A" and the driver is skilled in a sport driving technique, he/she can drive through a corner rapidly by accelerating the vehicle during cornering and thereby lifting the inside driving wheel above the ground so that a large torque is transmitted to the outside driving wheel and at the same time the side forces on the tires are reduced.

When, however, the driver is not skilled in such a sport driving technique and he/she happens to depress the accelerator pedal too much during cornering, the torque transmitted to the outside driving wheel becomes too large, and the side forces on the tires are reduced considerably, thus putting the vehicle in a condition of being liable to spin.

In the case where the assembly is designed to have the characteristic "B", it cannot effect a desired differential slip limiting action when the vehicle travels on a split-u road surface. This is because the assembly can produce a sufficiently large differential slip limiting torque only when the rotational speed differential becomes considerably large. Furthermore, the assembly cannot prevent tacking-in and cannot improve the braking ability during cornering to a desired extent.

It is also known to utilize a viscous coupling instead of a torque transmitting assembly of the above described kind. In this instance, a torque transmitting characteristic represented by, for example, a one-dot chain line curve "C" in the graph of FIG. 4 is obtained. As will be apparent from this graph, a desiredly large differential slip limiting torque cannot be obtained when the roational speed differential is large. When, on the contrary, the viscous coupling is designed to have a torque transmitting chracteristic represented by, for example, the one-dot chain line curve "D" in FIG. 4, i.e., designed so as to produce a desiredly large differential slip limiting torque when the rotational speed differential is large, it produces, even when the rotational speed differential is small, an undesiredly large differential slip limiting torque which will cause understeer.

SUMMARY OF THE INVENTION

In accordance with the present invention, there is provided an improved rotational speed differential responsive type torque transmitting assembly which comprises a first rotary element rotatable about an axis, said first rotary element including internal cam surface means, a second rotary element disposed in said first rotary element, said second rotary element including a rotor containing a plurality of radially outwardly opening cylinders facing said internal cam surface means, hydraulic means for transmitting a portion of torque from one of said first and second rotary elements to the other in response to a rotational speed differential between said first and second rotary elements, said hydraulic means including pistons in said cylinders in engagement with said internal cam surface means and reciprocate in response to said rotational speed differential to define variable volume pressure chambers in said cylinders, respectively, said hydraulic means including an accumulator with an accumulator chamber, and hydraulic fluid passage means in fluid communication with said pressure chambers and also with said accumulator chamber, said hydraulic fluid passage means allowing discharge of hydraulic fluid from each of said pressure chambers on the discharge stroke of the associated one of said pistons to said accumulator chamber, said hydraulic fluid passage means allowing a supply of hydraulic fluid from said accumulator chamber to each of said pressure chambers on the suction stroke of the associated one of said pistons, said hydraulic means including valve means for discharging a portion of hydraulic fluid from said accumulator chamber, said hydraulic means also including variable orifice means for restricting discharge of hydraulic fluid from each of the pressure chambers on the discharge stroke of the associated one of said pistons, said variable orifice means increasing in opening as said rotational speed differential increases beyond a predetermined value.

The above structure is effective for solving the above noted problems discussed in the "Description of the Prior Art".

It is accordingly an object of the present invention to provide an improved rotational speed differential responsive type torque transmitting assembly which can automatically regulate a differential slip limiting torque in response to a variation of rotational slip differential between driving wheels.

It is another object of the present invention to provide an improved torque transmitting assembly of the above described character which can easily and readily attain a desired differential slip limiting characteristic.

It is a further object of the present invention to provide an improved torque transmitting assembly of the above described character which is practical and useful, though simple in structure.

DESCRIPTION OF THE PREFERRED EMBODIMENTS

Figures 1, 2:
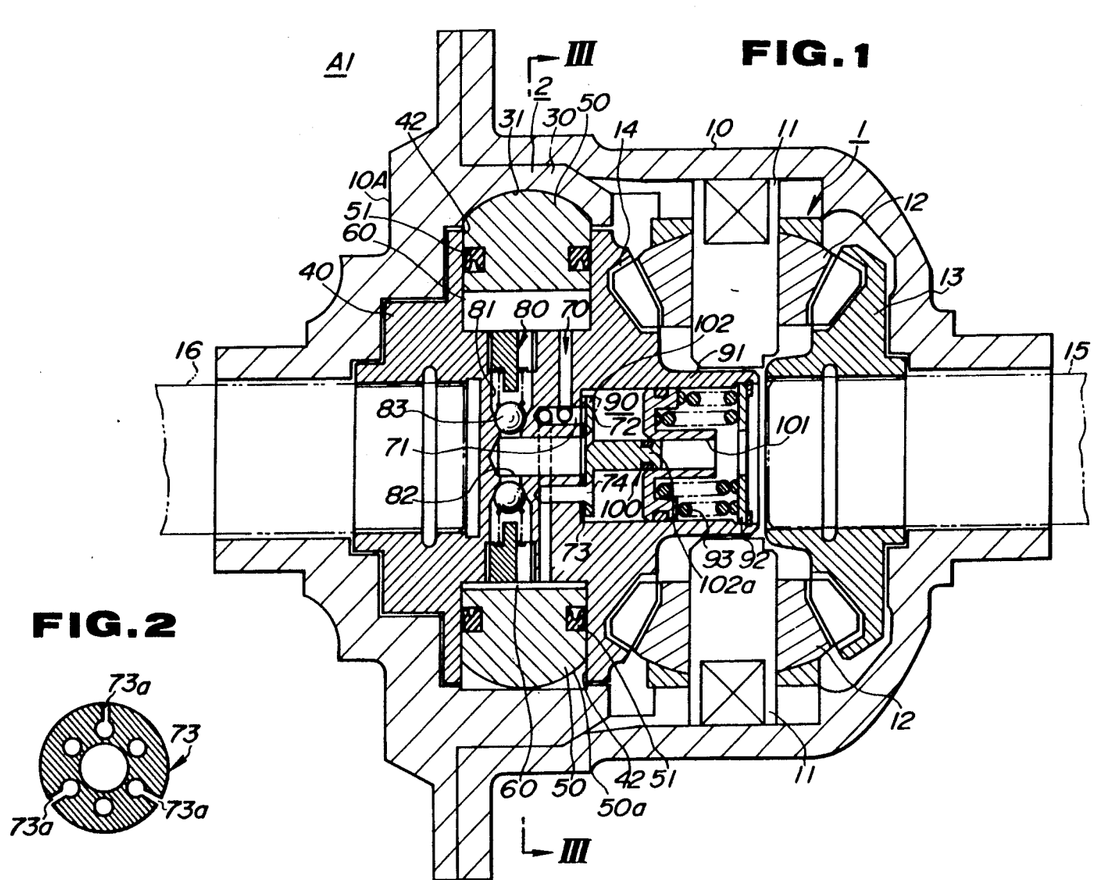
FIG. 1 is a sectional view taken along the line I—I of FIG. 3 and shows a differential unit incorporating a rotational speed differential responsive type torque transmitting assembly according to an embodiment of the present invention.
FIG. 2 is an elevational view of an orifice plate employed in the torque transmitting assembly of FIG. 1.

Referring to the accompanying drawings, FIG. 1 shows a limited slip differential unit generally indicated by the reference character A1 consists of a differential 1 and a rotational speed differential responsive type torque transmitting assembly 2.

The differential 1 comprises a driving member in the form of a rotary casing 10 rotatable about an axis, and two driven members in the form of two drive axles 15 and 16 extending in the opposite outward directions from the casing 10 generally along the axis which the casing 10 is rotatable about. A pinion carrier 11 is mounted in the casing 10 for rotation therewith and rotatably carries pinions 12. A pair of side gears 13 and 14 are splined to the pair of axle shafts 15 and 16.

Figure 3:
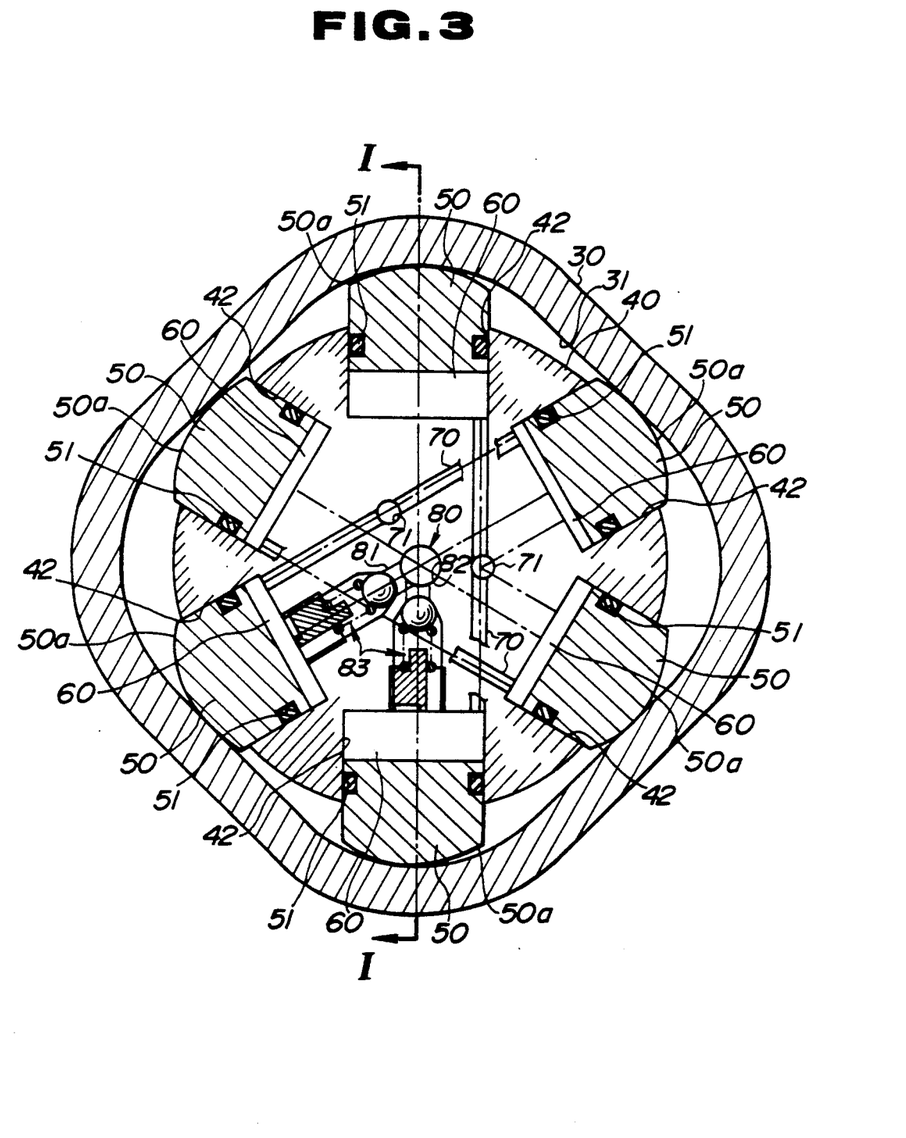
FIG. 3 is a sectional view taken along the line III—III of FIG. 1.

In order to restrain the rotational speed differential between the drive axle 16 and the casing 10, the rotational speed differential responsive type torque transmitting assembly 2 is provided. This assembly 2 comprises a first rotary element in the form of a cam ring 30 which a casing cover 10A is formed with. The casing cover 10A is secured to the casing 10 in a conventional manner. The cam ring 30 is formed with rise and fall cam surfaces 31 as best seen in FIG. 3. Surrounded by the cam ring 30 is a second rotary element in the form of a rotor 40. The rotor 40 has a left end portion, as viewed in FIG. 1, formed with the side gear 14 teeth, thus serving as a gear base for the side gear 14, and a right end portion, as viewed in FIG. 1, formed with a blind bore with internal splines to receive external splines formed on the axle shaft 16. When rotational speed differential occurs between the differential casing 10 and axle shaft 16, a portion of the drive is transmitted via hydraulic means which is hereinafter described.

The hydraulic means comprises the rise and fall cam surfaces 31, six cylinders 42 located in the rotor 40 (see FIG. 3), six pistons 50 positioned in the cylinders 42, respectively. Each piston 50 has a seal ring 51 to define a pressure chamber 60. The pistons 50 have spherically rounded tops 50a. The hydraulic means also comprises hydraulic fluid passage means. As best seen in FIG. 3, the hydraulic fluid passage means includes three axial passages 71, each having two radial passages 70 extending therefrom to two diametrically opposed pressure chambers 60. The axial passages 71 extend inwardly of the rotor 40 from a radially extending end wall of an accumulator chamber 90. However, fluid communication between the accumulator chamber 90 and the axial passages 71 are restricted at variable orifices 72.

The variable orifices 72 are defined by a retainer 102 in the form of a resiliently deformable disk and an orifice plate 73 (see also FIG. 2) positioned between the retainer 102 and the radially extending end wall of the accumulator chamber 90. The retainer 102 and orifice plate 73 are secured to the rotor 40 with screws 74. The orifice plate 73 is formed with three notches 73a which cooperate with the retainer 102 and the radially extending end wall of the accumulator chamber 90 to define therebetween restricted flow passages in communication with the respective axial passages 71 and the accumulator chamber 90.

Each of the variable orifices 72 maintaing a predetermined opening, i.e., the retainer 102 is held substantially unchaged in shape when the hydraulic pressure within the associated pressure chambers 60 is lower than a predetermined value. When the hydraulic pressure within the pressure chambers 60 exceeds a predetermined value, the retainer 102 resiliently deforms or bends increasingly away from the orifice plate 73 as the hydraulic pressure within the pressure chambers 60 increases, thus increasing the openings of the variable orifices 72 and therefore flow of hydraulic fluid toward the accumulator chamber 90.

The radial and axial passages 70 and 71 and accumulator chamber 90 cooperate to define a balance fluid circuit. Communicating with one of the two diameterically opposed pressure chambers 60 which are fluidly interconnected by the radial passages 70 and the associated axial passage 71 is a ball check valve 83. Each of the ball check valves 83 has a radial passage 81 with one end opening to a central axial passage 82. With these ball check valves 83, discharge of hydraulic fluid from the associated pressure chambers 60 through the associated radial passages 81 is prevented although supply of hydraulic fluid into these pressure chambers 60 is allowed. The central axial passage 82 has one end opening to the accumulator chamber 90 and extends inwadly of the rotor 40. This central axial passage 82, three ball check valves 83, and the accumulator chamber 90 cooperate with each other to form a regulator hydraulic circuit 80.

The accumulator chamber 90 is defined between the retainer plate 102 and the accumulator piston 91 which is biased toward the retainer plate 102 by an accumulator spring 93 in the form of a dual spring assembly. The accumulator spring 93 is operatively disposed between the accumulator piston 91 and a spring retainer ring 92 fixed to the rotor 40.

In order to prevent excessive increase of the hydraulic pressure within the accumulator chamber 90, the accumulator piston 91 is formed with an axial sleeve 101 defining a drain passage, while the retainer 102 has an axial rod 102a to slidably fit in the sleeve 101. The rod 102a has a seal ring engaging in seal tight manner with the inner wall of the sleeve 101. Thus, the rod 102a, the seal ring thereon, and the sleeve 101 cooperate with each other to form a relief valve generally indicated by the reference numeral 100. An increase in hydraulic pressure in the accumulator chamber 90 causes the accumulator piston 91 to displace to the right, as viewed in FIG. 1, against the accumulator spring 93. When the hydraulic pressure in the accumulator chamber 90 exceeds a predetermined value, the sleeve 101 becomes out of engagement with the seal ring carried by the rod 102a, allowing a portion of hydraulic fluid to be discharged from the accumulator chamber 90 through the sleeve 101.

The operation of the embodiment will be described hereinafter.

(A) In the case where there is no rotational speed differential, which takes place when a vehicle equipped with the limited slip differential unit A1 travels straight on a dry road at low to middle speed and thus there is no rotatioinal speed differential between the driving wheels coupled with the axle shafts 15 and 16. Since there occurs no rotational speed differential between the cam ring 30 integral with the casing cover 10A and the rotor 40, the pistons 50 do not reciprocate and thus there is no transmission of torque through the torque transmitting assembly 2. Therefore, the driving torque from engine is distributed equally between the axle shafts 15 and 16.

In the meantime, when the vehicle travels straight-ahead on a highway at high speed, the rotor 40 rotates at high speed in response to rotation of the axle shafts 15 and 16, thus subjecting the pistons 50 to a large centrifugal force. This centrifugal force urges the pistons 50 against the corresponding cam surfaces 31, thus limiting differential slip. In this manner, when the vehicle travels straight-ahead at high speed, the unit A1 is operative to limit differential slip to a certain extent and thus capable of improving the straight-ahead running stability on a highway, etc.

(B) In the case where there is rotational speed differential, the vehicle passes through a rough terrain and there occurs rotational speed differential between the axle shafts 15 and 16, rotational speed differential between the cam ring 30 integral with the casing cover 10A and the rotor 40 occurs. This rotational speed differential causes the pistons 50 to reciprocate since they slide on the rise and fall cam surfaces 31. When the pistons 50 reciprocate, hydraulic fluid is discharged from the pressure chambers 60 on the discharge strokes of the associated pistons 50 to the accumulator chamber 90 under the flow restriction provided by the variable orifices 72 defined by the orifice plate 73 and the retainer 102. This is accomplished by the radial passages 70 and the axial passages 71. Owing to the flow restriction provided by the variable orifices 72, a pressure increase occurs in each of the pressure chambers 60 on the discharge strokes of the pistons 50. This pressure increase urges the associated pistons 50 into firm engagement with the rise and fall cam surfaces 31. When a pressure drop occurs in the pressure chamber 60 during its suction stroke, hydraulic fluid from the accumulator chamber 90 is supplied to the pressure chamber 60. This is accomplished by the central axial bore 82 and the ball check valves 80. As a result, a portion of torque directly transmitted from the cam ring 30 to the rotor 40 increases as the rotational speed differential increases. Thus, a differential slip is limited in response to the torque transmitted from the cam ring 30 to the rotor 40. This torque is called a differential slip limiting torque.

The differential unit A1 with the rotational speed differential responsive type torque transmitting assembly 2 effects a differential slip limiting action represented by a two-dot chain line curve "E" in the graph of FIG. 4. As seen from this graph, when the rotational speed differential $\Delta N$ between the drive axles 15 and 16 is lower than a predetermined value $\Delta N_0$, the differential slip limiting torque increases generally abruptly along a curve of secondary order, i.e., generally increases at a relatively large rate for a given increase of rotational speed differential $\Delta N$. In this connection, the hydraulic pressure within the pressure chambers 60 increases as the rotational speed differential $\Delta N$ increases. When the rotational speed differentail $\Delta N$ increases to $\Delta N_0$, the hydraulic pressure within the pressure chambers 60 becomes equal to the hydraulic pressure within the accumulator chamber 90. Accordingly, when the hydraulic pressure within the pressure chambers 60 is smaller than a predetermined value, i.e., when the rotational speed differential $\Delta N$ is smaller than $\Delta N_0$, the variable orifices 72 maintain a predetermined opening.

When the rotational speed differential $\Delta N$ exceeds $\Delta N_0$, the openings of the variable orifices 72 increases as the rotational speed differential $\Delta N$ increases. In this instance, as seen from FIG. 4, the differential slip limiting torgue increases gradually along a characteristic curve similar to that obtained by a viscous coupling, i.e., increases at a relatively small rate for a given increase of rotational speed differential.

More specifically, when the rotational speed differential is small, i.e., ranges from zero to a certain small value, the differential slip limiting torque produced by the torque transmitting assembly 2 is small and increases at a relatively small rate for a given increase of rotational speed differential. This makes it possible to prevent understeer.

When the rotational speed differential becomes larger, i.e., ranges from the above described small value to a predetermined value $\Delta N_0$, the differential slip limiting torque increases at a relatively large rate for a given increase of rotational speed differential. This makes it possible to prevent tacking-in and improve the running ability of the vehicle on a split-$\mu$ road surface and the braking ability during cornering.

When the rotational speed differential becomes further larger, i.e., increases beyond $\Delta N_0$, the differential slip limiting torque increases at a relatively small rate for a given increase of rotational speed differential. This makes it possible, when the vehicle travelling on a snow-covered road ($\mu=0.3$), wet road ($\mu=0.45$), etc. is accelerated during cornering, to prevent excessive large increase of torque transmitted to the outside driving wheel and considerable reduction of side forces on tires.

Figure 5:
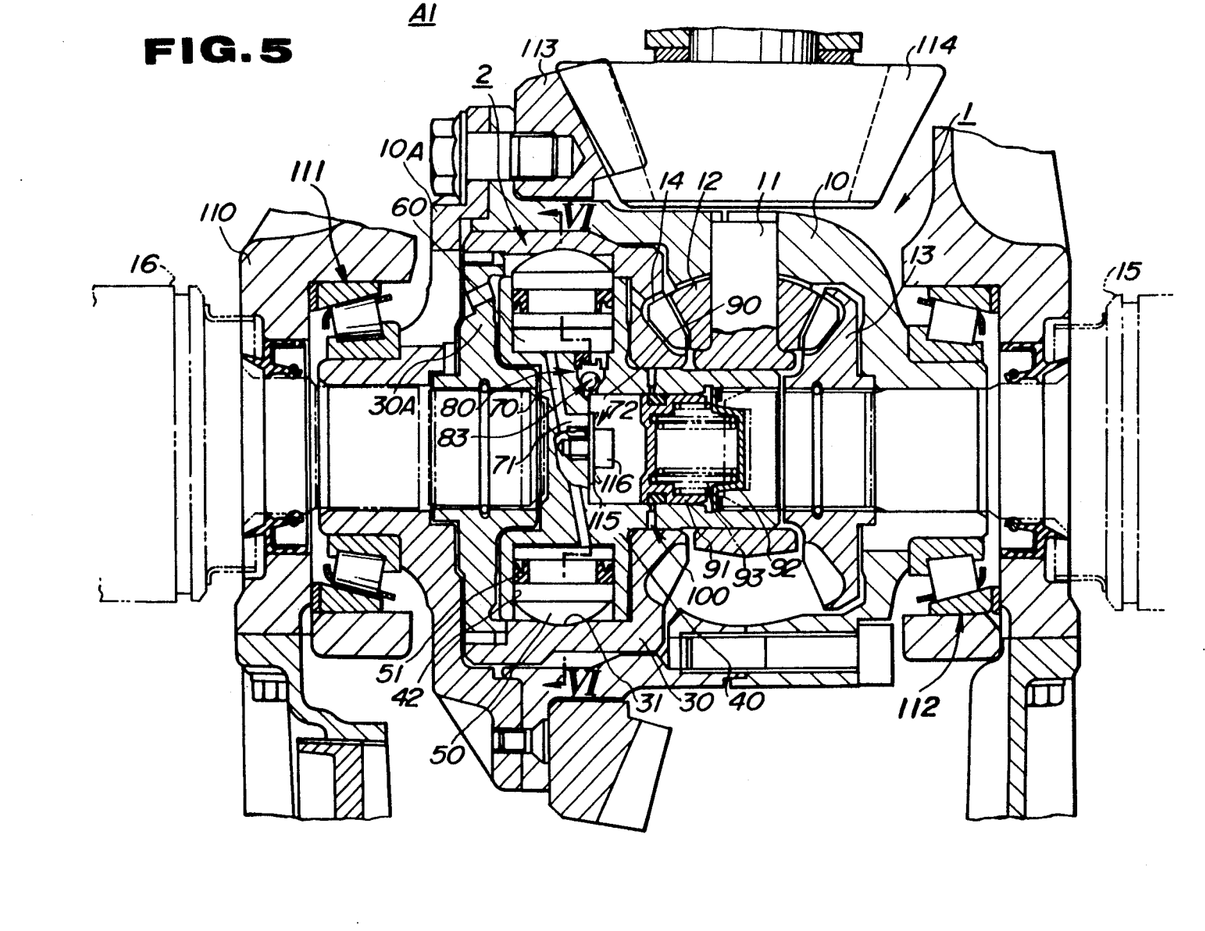
FIG. 5 is a view similar to FIG. 1 but shows another embodiment of the present invention.
Figure 6:
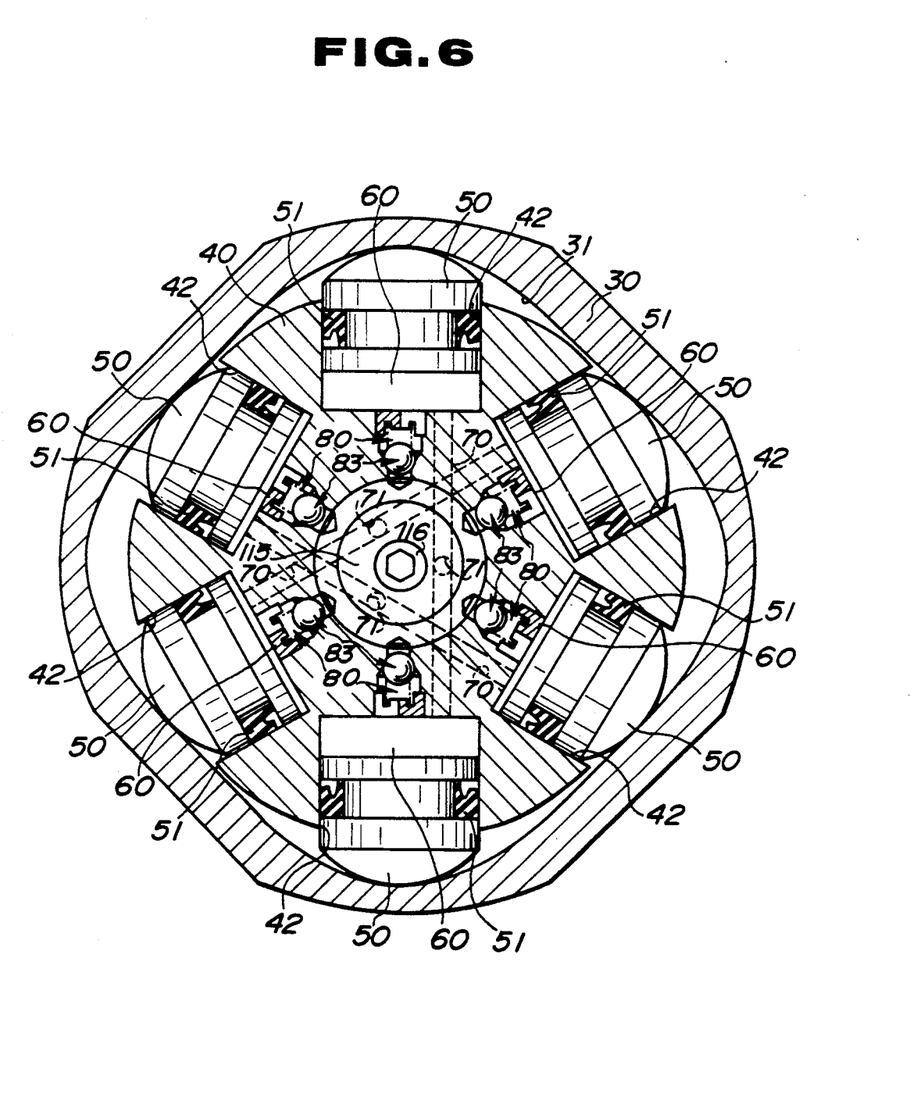
FIG. 6 is a sectional view taken along the line VI—VI of FIG. 5.
Figure 7:
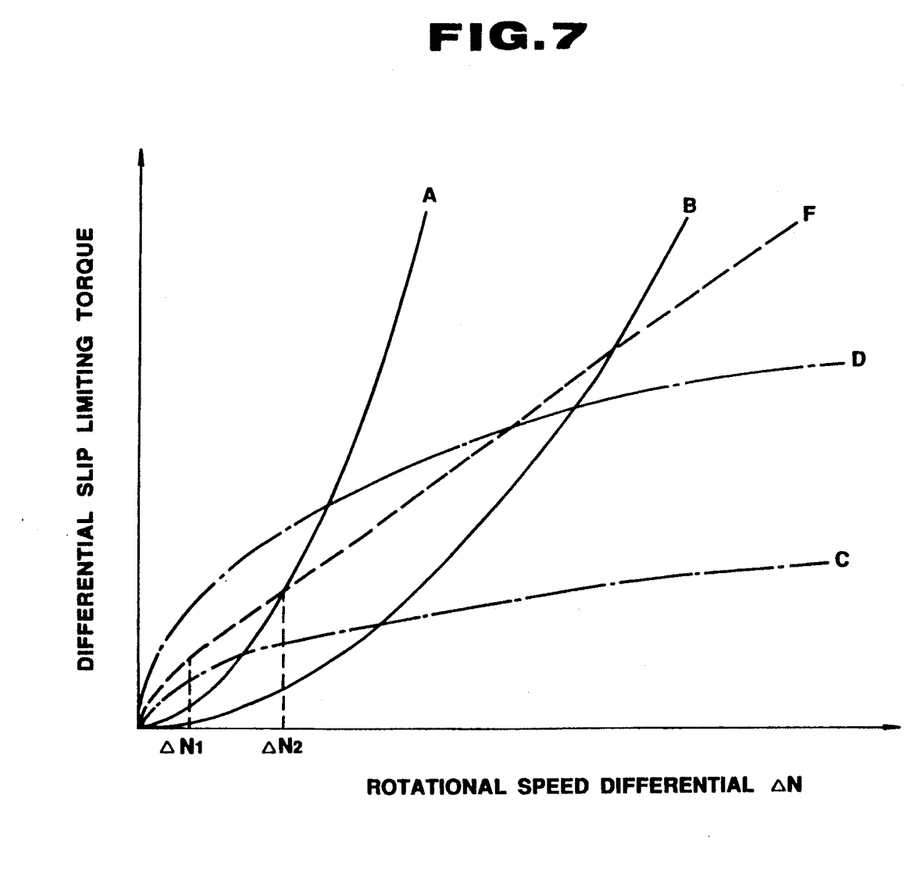
FIG. 7 is a graph depicting a torque transmitting characteristic of the torque transmitting assembly of FIG. 5.

Referring to FIGS. 5 to 7, it will be noted that the same reference numeral as those of the previous embodiment are used to designate the same or similar parts. In FIGS. 5 and 6, a differential casing 10 with a housing cover 10A is rotatably supported by a housing 110 by means of bearings 111 and 112. A ring gear 113 is fixed to the casing 10 by means of bolts. An input gear 114 meshes with the ring gear 113. A axle shaft 15 which is splined to a side gear 13 extends inwardly of a casing 10 into a central opening of the carrier 11 and is splined to a rotor 40 of a rotational speed differential responsive type torque transmitting assembly 2. The rotor 40 is surrounded by a cam ring 30 to which another side gear 14 is formed with. The cam ring 30 is splined to a hub 30A which is in turn splined to an axle shaft 16. As a result, an input torque transmitted to the differential casing 10 via the input gear 114 and the ring gear 113 is transmitted on one hand to the axle shaft 15 via a pinion 12 and side gear 13, and on the other hand to the axle shaft 16 via the pinion 12, cam ring 30, and splined hub 30A. A rotational speed differential responsive type torque transmitting assembly 2 shown in FIGS. 5 and 6 is substantially the same as that shown in FIGS. 1 to 3 except that a plate valve 115 which is secured to the rotor 40 by means of a bolt 116 is provided as a variable flow restrictor for the axial passages 71 instead of the variable orifices 72 as used in FIG. 1, radial relief passages are formed in the rotor 40 to cooperate with a seal ring on an accumulator piston 91 to constitute a relief valve 100, and radial passages 81 of check valves 83 directly open to an accumulator chamber 90.

With the plate valve 115, this embodiment has a torque transmitting characteristic represented by a dotted line curve "F" in the graph of FIG. 7. As seen from this graph, the differential slip limiting torque generally increases at a fixed or constant rate for a given increase of rotational speed differential $\Delta N$. More specifically, when the rotational speed differential $\Delta N$ is lower than a predetermined value $\Delta N_1$, the plate valve 115 is held closed, thus allowing the hydraulic pressure within the chambers 60 to increase at a certain rate which is not too large for a given increase of the rotational speed differential $\Delta N$. The hydraulic pressure within the pressure chambers 60 becomes equal to the hydraulic pressure within the accumulator chamber 90 when the rotational speed differential $\Delta N$ increases to $\Delta N_1$. The plate valve 115 opens when the rotational speed differential $\Delta N$ exceeds $\Delta N_1$ and increases in opening as the rotational speed differential $\Delta N$ increases.

The plate valve 115 in this embodiment is designed to have, when there occurs rotational speed differential $\Delta N_2$, an opening substantially equal to that of a fixed orifice (i.e., an orifice whose opening is fixed and not variable) employed in a torque transmitting assembly which is adapted to have a torque transmitting characteristic represented by a solid line curve "A" in the graph of FIG. 7. By this, when the rotational speed differential $\Delta N$ is in a middle range, i.e., ranges from $\Delta N_1$ to $\Delta N_2$, the opening of the plate valve 90 is smaller than the opening of the above described fixed orifice, thus making it possible to provide more restricted fluid communication betweeen the pressure chambers 60 and the accumulator chamber 90 and therefore a larger differential slip limiting torque as compared with the torque transmitting characteristic "A" depicted by a curve of secondary order.

When the rotational speed differential exceeds $\Delta N_2$, the opening of the plate valve 115 becomes larger than that of the fixed orifices, thus making it possible to provide less restricted fluid communication between the pressure chambers 60 and the accumulator chamber 90 and therefore a smaller differential slip limiting torque as compared with the torque transmitting characteristic "A" depicted by a curve of secondary order.

This embodiment therefore can produce substantially the same effect as the previous embodiment of FIGS. 1 to 4.

What is claimed is:

1. A rotational speed differential responsive type torque transmitting assembly, comprising:

a first rotary element rotatable about an axis, said first rotary element including internal cam surface means;

a second rotary element disposed in said first rotary element, said second rotary element including a rotor containing a plurality of radially outwardly opening cylinders facing said internal cam surface means;

hydraulic means for transmitting a portion of torque from one of said first and second rotary elements to the other in response to a rotational speed differential between said first and second rotary elements;

said hydraulic means including pistons in said cylinders in engagement with said internal cam surface means and reciprocate in response to said rotational speed differential to define variable volume pressure chambers in said cylinders, respectively;

said hydraulic means including an accumulator with an accumulator chamber, and hydraulic fluid passage means in fluid communication with said pressure chambers and also with said accumulator chamber, said hydraulic fluid passage means allowing discharge of hydraulic fluid from each of said pressure chambers on the discharge stroke of the associated one of said pistons to said accumulator chamber, said hydraulic fluid passage means allowing supply of hydraulic fluid from said accumulator chamber to each of said pressure chambers on the suction stroke of the associated one of said pistons;

said hydraulic means including valve means for discharging a portion of hydraulic fluid from said accumulator chamber;

said hydraulic means also including variable orifice means for restricting discharge of hydraulic fluid from each of the pressure chambers on the discharge stroke of the associated one of said pistons, said variable orifice means increasing in opening as said rotational speed differenital increases beyond a predetermined value.

2. A torque transmitting assembly as claimed in claim 1 wherein said vairable orifice means is constant in opening when said rotational speed differential is smaller than said predetermined value.

3. A rotational speed differential responsive type torque transmitting assembly, comprising:

a first rotary element rotatable about an axis, said first rotary element including internal cam surface means;

a second rotary element disposed in said first rotary element, said second rotary element including a rotor containing a plurality of radially outwardly opening cylinders facing said internal cam surface means;

hydraulic means for transmitting a portion of torque from one said first and second rotary elements to the other in response to a rotational speed differential between said first and second rotary elements;

said hydraulic means including pistons in said cylinders in engagement with said internal cam surface means and reciprocating in response to said rotational speed differential to define variable volume pressure chambers in said cylinders, respectively;

said hydraulic means including an accumulator with an accumulator chamber, an hydraulic fluid passage means in fluid communication with said pressure chambers and also with said accumulator chamber, said hydraulic fluid passage means allowing discharge of hydraulic fluid from each of said pressure chambers on the discharge stroke of the associated one of said pistons to said accumulator chamber, said hydraulic fluid passage means allowing supply of hydraulic fluid from said accumulator chamber to each of said pressure chambers on the suction stroke of the associated one of said pistons;

said hydraulic means including valve means for discharging a portion of hydraulic fluid from said accumulator chamber;

said hydraulic means also including variable orifice means for restricting discharge of hydraulic fluid from each of the pressure chambers on the discharge stroke of the associated one of said pistons, said variable orifice means increasing in opening as said rotational speed differential increases beyond a predetermined value;

said variable orifice means being constant in opening when said rotational speed differential is smaller than said predetermined value;

wherein said variable orifice means comprises a retainer and an orifice plate interposed between said retainer and a radially extending end wall of said accumulator chamber, said orifice plate being formed with a plurality of openings which cooperate with said retainer and said radially extending end wall of said accumulator chamber to define restricted fluid passages in communication with said hydraulic fluid passage means and said accumulator chamber, said retainer being secured together with said orifice plate to said radially extending end wall of said accumulator chamber and resiliently deforming away from said orifice plate increasingly as a hydraulic pressure within said pressure chambers increases.

4. A torque transmitting assembly as claimed in claim 3, further comprising a differential casing rotatable about said axis, a pinion carrier rotatable with said differential casing, pinions rotatably carried by said pinion carrier, a pair of side gears meshing with said pinions, wherein said first rotary element includes a casing cover secured to differential differential casing, said casing cover being formed with a cam ring with said internal cam surface means, and wherein said second rotary element includes a rotor integral with one of said side gear, said rotor containing said plurality of radially outwardly opening cylinders.

5. A torque transmitting assembly as claimed in claim 4 wherein said hydraulic fluid passage means includes means whereby hydraulic fluid discharged from said valve means flows in radially outward directions toward said radially outwardly opening cylinders.

6. A torque transmitting assembly as claimed in claim 5 wherein each of said pistons has a seal ring which is constructed and arranged as to allow hydraulic fluid to flow radially inwardly into each of the pressure chambers on the suction stroke of the associated one of said pistons.

7. A torque transmitting assembly as claimed in claim 6 wherein said accumulator includes an accumulator piston, and said valve includes a drain opening to said accumulator chamber, a sleeve integral with said accumulator piston and defining said drain port, a rod stationary relative to said rotor extending into said sleeve, and means carried by said rod for sealably engaging with said sleeve.

8. A torque transmitting assembly as claimed in claim 1 wherein said variable orifice means prevents said discharge of hydraulic fluid from each of said pressure chambers when said rotational speed differential is smaller than said predetermined value.

9. A rotational speed differential responsive type torque transmitting assembly, comprising:

a first rotary element rotatable about an axis, said first rotary element including internal cam surface means;

a second rotary element disposed in said first rotary element, said second rotary element including a rotor containing a plurality of radially outwardly opening cylinders facing said internal cam surface means;

hydraulic means for transmitting a portion of torque from one of said first and second rotary elements to the other in response to a rotational speed differential between said first and second rotary elements;

said hydraulic means including pistons in said cylinders in engagement with said internal cam surface means and reciprocating in response to said rotational speed differential to define variable volume pressure chambers in said cylinders, respectively;

said hydraulic means including an accumulator with an accumulator chamber, and hydraulic fluid passage means in fluid communication with said pressure chambers and also with said accumulator chamber, said hydraulic fluid passage means allowing discharge of hydraulic fluid from each of said pressure chambers on the discharge stroke of the associated one of said pistons to said accumulator chamber, said hydraulic fluid passage means allowing supply of hydraulic fluid from said accumulator chamber to each of said pressure chambers on the suction stroke of the associated one of said pistons;

said hydraulic means including valve means for discharging a portion of hydraulic fluid from said accumulator chamber;

said hydraulic means also including variable orifice means for restricting dicharge of hydraulic fluid from each of the pressure chambers on the discharge stroke of the associated one of said pistons, said variable orifice means increasing in opening as said rotational speed differential increases beyond a predetermined value;

said variable orifice means preventing said discharge of hydraulic fluid from each of said pressure chambers when said rotational speed differential is smaller than said predetermined value;

wherein said variable orifice means comprises a plate valve secured to a radially extending end wall of said accumulator chamber in such a way as to obstruct communication between said accumulator chamber and said hydraulic fluid passage means when a hydraulic pressure within said pressure chambers is lower than a predetermined level and resiliently deforming increasingly away from said radially extending end wall of said accumulator chamber to provide increasing communication between said accumulator chamber and said hydraulic fluid passage means as the hydraulic pressure within said pressure chambers increases beyond said predetermined level.

10. A torque transmitting assembly as claimed in claim 9, further comprising a differential casing rotatable about said axis, a pinion carrier rotatable with said differential casing, in pinion rotatably carried by said pinion carrier, a pair of side gears meshing with said pinion, wherein said first rotary element includes a cam ring integral with one of said pair of side gears, said cam ring including said internal cam surface means, and wherein said second rotary element includes a rotor drivingly connected to the other of said pair of side gears, said rotor containing said plurality of radially outwardly opening cylinders.

11. A torque transmitting assembly as claimed in claim 10 wherein said hydraulic fluid passage means includes means whereby hydraulic fluid discharged from said valve means flows in radially outward directions toward said radially outwardly opening cylinders.

12. A torque transmitting assembly as claimed in claim 11 wherein each of said pistons has a seal ring which is constructed and arranged as to allow hydraulic fluid to flow radially inwardly into each of the pressure chambers on the suction stroke of the associated one of said pistons.

13. A torque transmitting assembly as claimed in claim 12 wherein said accumulator includes an accumulator piston, and said valve means includes a drain port opening to said accumulator chamber, a circumferential wall defining said accumulator chamber being formed with said drain port, said accumulator piston being axially movable to open and close said drain port.

* * * * *